US005758025A

United States Patent [19]

Wu

[11] Patent Number: 5,758,025

[45] Date of Patent: May 26, 1998

[54] DYNAMICALLY ADAPTIVE FUZZY INTERVAL CONTROLLER

[76] Inventor: Kung Chris Wu, 3103 Oakgate Way, San Jose, Calif. 95148

[21] Appl. No.: 461,637

[22] Filed: Jun. 5, 1995

[51] Int. Cl.[6] .......... G06F 15/18

[52] U.S. Cl. .......... 395/3; 395/900; 395/51

[58] Field of Search .......... 318/628; 395/3, 395/10–11, 60–61, 76, 900

[56] References Cited

U.S. PATENT DOCUMENTS

| | | | |
|---|---|---|---|
| 4,958,288 | 9/1990 | Takahashi | 364/426.046 |
| 5,218,542 | 6/1993 | Endo et al. | 364/424.032 |
| 5,245,698 | 9/1993 | Matsunaga | 395/61 |
| 5,249,126 | 9/1993 | Hattori | 364/424.032 |
| 5,251,288 | 10/1993 | Nomura et al. | 395/51 |
| 5,255,344 | 10/1993 | Takagi et al. | 395/3 |
| 5,280,624 | 1/1994 | Ikeda | 395/3 |
| 5,295,061 | 3/1994 | Katayama et al. | 364/157 |
| 5,295,226 | 3/1994 | Yamakawa | 395/3 |
| 5,367,610 | 11/1994 | Ohtsubo et al. | 395/3 |
| 5,388,190 | 2/1995 | Nakano | 395/61 |
| 5,397,973 | 3/1995 | Dummermuth | 318/628 |
| 5,412,752 | 5/1995 | Basehore et al. | 395/3 |
| 5,561,738 | 10/1996 | Kinerk et al. | 395/3 |
| 5,600,757 | 2/1997 | Yamamoto et al. | 395/3 |

FOREIGN PATENT DOCUMENTS

| | | |
|---|---|---|
| 2134451 | 5/1990 | Japan . |
| 3125062 | 5/1991 | Japan . |

OTHER PUBLICATIONS

*Fuzzy Sets and Fuzzy Logic: Theory and Applications*, Klir, G.J. and Yuan, B., Prentice Hall, 1995 pp. 11–19.

"A Robot Must Be Better Than a Human Driver: An Application of Fuzzy Intervals.", Wu, Proceedings of the North American Fuzzy Information Processing Society Biannual Conference, pp. 171–174, Dec. 18–21, 1994.

"Fuzzy Logic Control of a Robot Mouse", Wu, Proceedings of the Fifth International Symposium on Robotics and Manufacturing, Aug. 14–18, 1994, pp. 315–320.

"Fuzzy Logic", Zadeh, IEEE Transactions, Apr., 1988, pp. 83–92.

"Automobile Speed Control System Using a Fuzzy Logic Controller", Murakami and Maeda, Industrial Applications of Fuzzy Control, 1985, pp. 105–123.

"Adaptive Fuzzy Systems for Backing up a Truck-and-Trailer", Kong and Kosko, IEEE Transactions, Mar., 1992, pp. 211–223.

"An Improved Methodology for the Design of Fuzzy Logic Controllers", Thupili, Master's Thesis, University of Texas at El Paso, Dec., 1993.

*Primary Examiner*—Tariq R. Hafiz

*Attorney, Agent, or Firm*—John VandenBosche

[57] ABSTRACT

A fuzzy logic controller that is dynamically adaptive to varying operating conditions. The controller remaps the intervals of the membership functions between a normalized universe of discourse and the real axis by use of an input fuzzy gain and an output fuzzy gain. The membership functions are also remapped within the universe of discourse through the use of a sensitivity index. Remapping of the membership functions allows the sensitivity of the controller to be adapted to optimize the controller's performance in changing operating conditions. This allows a robust controller to be implemented at low computational expense.

20 Claims, 5 Drawing Sheets

DYNAMICALLY ADAPTIVE FUZZY INTERVAL CONTROLLER

FIELD OF THE INVENTION

This invention pertains to the field of fuzzy logic controllers. More specifically, it pertains to a fuzzy logic controller that is dynamically adaptive to give the desired system performance under any set of operating conditions.

BACKGROUND OF THE INVENTION

Many physical systems have controllers to control some state variables of the system to a desired value. For example, automobiles often have cruise controllers that maintain a desired cruising speed. Many types of controllers have been developed to improve the dynamic control of physical systems. Examples of different types of controllers are binary state ON-OFF controllers, proportional integral derivative (PID) controllers, state feedback optimal controllers, neural networks and fuzzy logic controllers.

Fuzzy logic controllers have been developed in recent years and have been found to be highly successful in controlling systems that are non-linear and are not easily modeled mathematically. Fuzzy logic controllers simulate the control action of a human operator by applying a school of inexact knowledge to imprecise data to thereby infer an approximate control action.

Fuzzy logic controllers have three basic components; the fuzzifier, the fuzzy inference engine, and the defuzzifier. A block diagram of a typical prior art fuzzy logic controller is shown in FIG. 1. The membership functions associated with a typical prior art fuzzy logic controller are shown in FIG. 2.

The fuzzifier evaluates a crisp input in a set of membership functions for linguistic properties of the input. For instance, in the case of a cruise controller for an automobile, the actual vehicle speed may be 60 mph whereas the desired speed is 55 mph. The input of 60 mph can be evaluated in membership functions which describe linguistic properties such as "too slow", "a little too slow", "approximately the right speed", "a little too fast", and "too fast". The membership functions are shown in FIG. 2. In the example given, the speed of 60 mph is 5 mph over the target speed and may belong partly to the property of "a little too fast" and partly to the property of "too fast".

The fuzzy inference engine as shown in FIG. 1 takes the "fuzzified" input data and uses that to determine a "fuzzified" output. The fuzzy inference engine determines a fuzzy output from a given fuzzy input by applying a set of linguistic rules. For instance there might be rules that say things like "if the car is going a little too fast then decrease the accelerator position by a little bit."

This results in a set of fuzzified output membership functions that have to be defuzzified into a crisp output. Output data may be defuzzified in a number of ways. Defuzzification methods include the Center-of-Sums method, the Middle-of-Maximum method, and the Height method. A complete description of defuzzification methods and other aspects of fuzzy logic controllers may be found in a number of textbooks and articles. Therefore a more complete description will not be given here.

In traditional applications of fuzzy logic control, one is formalizing the experience of a skilled operator. A skilled operator of a system should be able to define what is a "large positive error" or a "small negative error", etc . . . A skilled operator can also decide what is the appropriate action to take in the event of a given measured input variable. If the operator has extensive experience with the system then very good fuzzy logic control rules can be formulated. In this way, complicated systems can be controlled much more accurately than would ever be possible with other control techniques.

If, however, the system to be controlled is one with which operators have little or no experience then the experts are pretty much uncertain about the linguistic properties of the controlled variables and the rules and the resulting membership functions are not well defined. If one applies fuzzy logic control methodology to this set of rules, then, since the expert rules are not well defined, one may get results that do not make much sense.

In the case of a system with which operators have little or no experience, methods have been developed in which an initial guess of membership functions and control rules are input and then tuned to optimize the system behavior. In U.S. Pat. No. 5,251,288 to Nomura et al a non-linear programming technique is used to tune the membership functions. In U.S. Pat. No. 5,255,344 to Takagi et al a neural network is used to tune the membership functions. U.S. Pat. No. 5,245,698 to Matsunaga describes a method of tuning the membership functions for a PD type fuzzy logic controller. U.S. Pat. No. 5,295,061 to Katayama et al describes a simplex method for tuning the membership functions of a fuzzy logic controller. In all of these methods it is necessary to have a precise knowledge of the desired output from the controller corresponding to any set of operating conditions in order to be able to tune the membership functions. For highly complicated systems in which the system behavior or the operating environment is unknown or unpredictable these methods are not suitable. Furthermore, these methods only tune the membership functions for one set of operating conditions. If the operating conditions are smoother or rougher than those for which the membership functions were optimized then the controller may still give results that only partially make sense. These methods are intended to optimize the controller before it is set up or installed and then the controller is used "as is." The prior art methods do not contemplate dynamically adjusting the membership functions under changing operating conditions.

Another problem with conventional fuzzy logic controllers is that if they provide adequately sensitive control they typically must use a large number of membership functions and rules and then they are computationally expensive in terms of hardware requirements and computation speed. The sensitivity of a fuzzy logic controller is related to the slope of the membership functions which is in turn related to how many membership functions there are. In FIG. 2 it can be seen that the membership functions range over values from −6 mph to +6 mph. In general the membership functions range over −u to +u. The range −u to +u is called the universe of discourse and defines the range of errors that the controller is sensitive to. Errors smaller than −u or larger than +u will be considered to be −u or +u. The more membership functions that there are between −u to +u the narrower the membership functions will be. Narrower membership functions mean more sensitive control. The problem is that if the universe of discourse is large (if there can be large errors away from the target value of the controlled variable) then the memory requirements to hold enough membership functions for reasonable sensitivity becomes prohibitive. Thus we have a trade-off between increasing the number of membership functions to give more sensitive control at higher computational expense and decreasing the number of membership functions to give coarser control at reduced computational expense. Some literature, such as the article "Adaptive Fuzzy Systems for Backing up a Truck-and-Trailer", Kong and Kosko, IEEE Transactions on Neural Networks, Vol.3, No. 2, March 1992 suggests making the membership functions near zero error narrow to give fine control and the membership functions at large error wide to give coarse control. This solution may work in some operating conditions, but there may be operating conditions in which one would want sensitive control at large errors of the controlled variable. In all of the prior art, greater control sensitivity has meant greater computational expense.

It would be desirable to have a fuzzy logic controller that can be designed without any pre-knowledge of the system behavior and that has appropriate without requiring unreasonable computational expense. Furthermore, it would be desirable if such a system were robust and able to dynamically tune itself to changing operating conditions.

SUMMARY OF THE INVENTION

The present invention uses dynamic remapping of the membership functions to achieve a robust adaptive fuzzy logic controller. The methodology bases its theory on linear interval mapping which is translation and scale invariant. The structure of the controller consists of an underlying standard fuzzy logic controller with a fixed number of input and output membership functions and a fixed number of fuzzy rules. The inputs and outputs to the controller are multiplied by a input fuzzy gain and an output fuzzy gain so that the underlying fuzzy logic controller operates in a normalized universe of discourse (the numeric values of the inputs and outputs range from −1 to +1). The membership functions of the fuzzy logic controller are dynamically remapped by use of a sensitivity index that determines the shape of the membership functions. A performance optimizer determines the values of the input fuzzy gain, the output fuzzy gain, and the sensitivity index at each control cycle.

By adjusting the controller parameters called the input fuzzy gain, the output fuzzy gain and the sensitivity index the dynamic behavior of the controller can be altered in real time without increasing the number of fuzzy membership functions or fuzzy rules. Therefore the resulting controller is dynamically adaptive and its input-output relationship is no longer deterministic. The adaptiveness of the controller allows it to have the desired dynamic behavior while minimizing computational hardware requirements and speed. The controller can be designed with little or no a-priori knowledge of the controlled system. It is also very robust in being able to adapt itself to changing operating conditions.

The input fuzzy gain and output fuzzy gain scale the input and output variables to have a value between −1 to +1. Thus the variables are remapped between the real axis and a normalized universe of discourse. If the measured errors are small for a given period of time the fuzzy input gain and fuzzy output gain can be decreased. If errors are measured to have a magnitude greater than 1 in the normalized universe of discourse then the gains must be increased. Decreasing the input causes the membership functions to be narrower when remapped to the real axis. Therefore, a smaller input gain gives finer and more sensitive control. A larger input gain gives coarser control. The output fuzzy gain has the effect of determining the maximum amount of control force that is available to the controller. Therefore, increasing the output gain causes larger control forces to the actuators for a given input error. Hence, the controller is more sensitive to small errors when the output gain is increased. The input fuzzy gain determines how much control force will be used out of the total control force available to the controller.

The membership functions used in the present invention are triangular and are defined by three points a, b, c as shown in FIG. 3. The point a represents the left-hand side of the membership function, b represents the point at which the function returns its maximum value, and c represents its right-hand side. The sensitivity index is used to define the values of the points a, b, c for each membership function to thereby to remap the membership functions. A smaller value of the sensitivity index tends to shift the membership functions towards the center of the universe of discourse. Larger values of the sensitivity index tends to shift the membership functions away from the center of the universe of discourse. Therefore, a smaller value of the sensitivity index causes the controller to be more sensitive to small errors in the controlled variable and a larger value of the index causes the controller to be more sensitive to large errors in the controlled variable. The role of the sensitivity index, as used in the controller of the present invention, is to increase or decrease the damping in the system response.

The key to the fuzzy interval controller of the present invention is the performance optimizer. The performance optimizer monitors the system behavior and adjusts the three controller parameters to give the desired behavior. The performance optimizer keeps track of the error in the controlled variable over the last several control cycles. If the total error is below some threshold value and the rate of change of the error is also below a threshold value then no control action needs to be taken. In this case the output fuzzy gain can be set to zero and the controller will be suppressed. If the error in the controlled variable is above the threshold value but still small then the input fuzzy gain is decreased to give finer control. If the error is large then both the input fuzzy gain and output fuzzy gain are increased to give larger control force and bring the system back under control. In any case, if the rate of change of error shows the error to be growing then the output fuzzy gain is increased to give greater control action to prevent the error from continuing to grow.

If the error and rate of change of error is such that neither the input fuzzy gain nor the output fuzzy gain are adjusted, then the performance optimizer performs a linear regression and root mean square (RMS) calculation to see if the system performance is improving, staying the same, or degrading and whether the controlled variable has been oscillating about the target value. If the controlled variable has been oscillating about the target value but the system performance is generally improving then the sensitivity index is increased to give less sensitivity to small errors in the controlled variable. If the system performance is degrading or staying the same then the sensitivity index is decreased to make the system more sensitive to small errors in the controlled variable. If the system performance is improving and the error has not been oscillating about the target value, then the sensitivity is not adjusted.

It is an objective of the present invention to provide a fuzzy logic controller that is dynamically adaptive to give the desired behavior in any operating condition with a minimal number of fuzzy membership functions and fuzzy rules.

It is a further objective of the invention to provide a fuzzy logic controller that gives high sensitivity during "smooth" operating conditions and low sensitivity during "rough" operating conditions.

It is a further objective of the invention to provide a fuzzy logic controller that can be designed without any a-priori knowledge of the controlled system.

It is a further objective of the invention to provide a fuzzy logic controller that has high computational speed with low computer hardware and memory requirements.

It is a further objective of the invention to provide a fuzzy logic controller that incorporates low-cost embedded micro-controllers for cost sensitive applications.

It is a further objective of the invention to provide a fuzzy logic controller that can be suppressed to give zero output.

The foregoing and other objects and advantages of the invention will be more fully understood from the following detailed description of the invention and from the accompanying drawings.

DETAILED DESCRIPTION OF THE INVENTION

Figure 1:
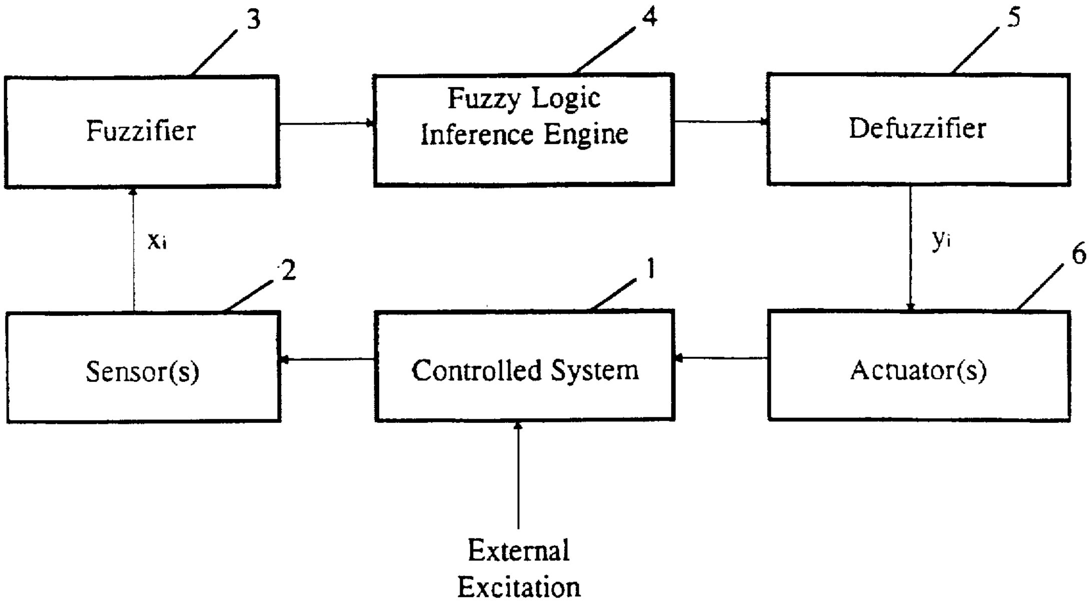
FIG. 1 is a block diagram of a prior art fuzzy logic controller.

The controller of the present invention is an improvement on a conventional fuzzy logic controller. The heart of the invention consists of a conventional fuzzy logic controller as shown in FIG. 1. As can be seen in FIG. 1 a standard fuzzy logic controller consists of a controlled system 1, at least one sensor 2 to input the value of the controlled variable into the controller, a fuzzifier 3, a fuzzy inference engine 4, a defuzzifier 5, and at least one actuator 6 which provides some control action to the system.

The controlled system 1 can be any type of a system that may be controlled. Examples of controllable systems may include, for example, a cruise control on an automobile, aerodynamic control surfaces on an airplane, motors or actuators in a robot, fluid flow rate in a fluid system, temperature of a thermodynamic system, nuclear processes in a nuclear reactor, chemical processes in a chemical plant, etc . . . Literally an infinite number of applications can be thought of for fuzzy logic controllers and the controller of the present invention is intended to be applicable to any control process in any physical system. One particular application in which the controller of the present invention has proved to be highly successful is in synchronizing two motors to operate together. Specifically, the two motors served as an electrical differential drive train and were on the wheels of a mobile robot. They were synchronized to provide steering to the mobile robot by turning at appropriate rates relative to each other.

The sensor 2 shown in FIG. 1 can be a single sensor for a single input—single output controller or there may be several sensors for a multi input—multi output system. For instance if the controller is a cruise control for an automobile, then the sensor would simply be a speedometer with appropriate analog to digital conversion. In a more complicated system such as an aerodynamic control system for an airplane, the sensors may sense the plane's air speed, altitude, rate of climb, attitude, thrust force from the engines, etc. . . The actuator 6 shown in FIG. 1 may be a single actuator or there may be several actuators. An example of a single actuator is the cruise controller on an automobile in which the actuator is the position of the accelerator. An example of a multiple actuator system is a robotic arm with a motor for each degree of freedom that must act together to provide the prescribed motion to the end effector. For the sake of simplicity, the description of the fuzzy logic controller of the present invention will focus on a single input-single output system but it is to be understood that the controller could by used for a multiple input—multiple output system.

Figure 2:
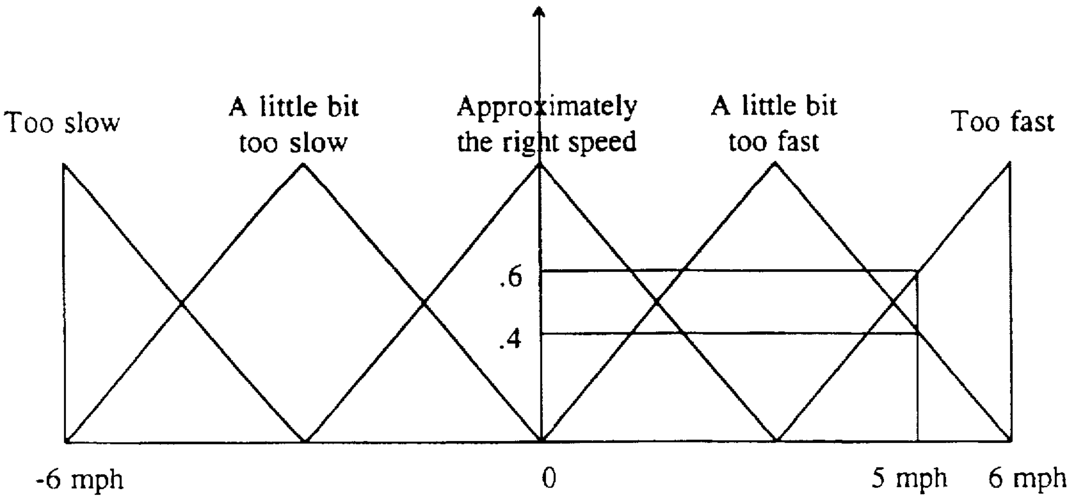
FIG. 2 shows a set of membership functions for the prior art fuzzy logic controller of FIG. 1.

The fuzzifier 3 shown in FIG. 1 takes the value of the controlled variable and evaluates it in a set of membership functions so as to fuzzify the variable. The membership functions are shown in FIG. 2. Each membership function represents a linguistic quality such as "too slow", "a little bit too slow", "approximately the right speed", "a little bit too fast", "too fast", etc . . . The value that each membership function returns is the degree of belief that the variable is described by the linguistic quality for that membership function. For instance, if an automobile is traveling at 5 mph above a target speed one might have a 40% belief that the car is going "a little bit too fast" and a 60% belief that the car is going "too fast". Therefore, those two membership functions would return values of 0.4 and 0.6 respectively and all other membership functions would return values of 0.

The fuzzy logic inference engine 4 shown in FIG. 1 applies fuzzy rules to the fuzzified input. The rules in the fuzzy logic inference engine would normally be determined by an expert operator of the system to be controlled. The fuzzy rules may say things "like if the car is going the right speed then leave the accelerator where it is", "if the car is going a little bit too fast then let up on the accelerator a little bit", or "if the car is going too fast then let up on the accelerator by a moderate amount." In the example given, the car was found have memberships of 0.4 in "going a little bit too fast" and 0.6 in "going too fast." Therefore there will be a fuzzy output to the actuator that has 40% belief in "letting up on the accelerator a little bit" and 60% belief in "letting up on the accelerator by a moderate amount."

The defuzzifier 5 shown in FIG. 1 must take the fuzzified output and defuzzify it to a specific crisp instruction to the actuator. The defuzzifier generally will have output membership functions similar to the input membership functions. The output membership functions give approximate numerical values to what is meant by linguistic rules such as "let up on the accelerator by a little bit" or "let up on the accelerator by a moderate amount." The defuzzifier scales the output membership functions by an appropriate ratio that comes from the fuzzy logic inference engine. From the scaled output membership functions, the defuzzifier must now determine a single crisp output value to give to the actuator.

Several methods have been suggested for doing so. Among them are the Center-of-Sums method, the Middle-of-Maximum method, and the Height method. The Center-of-Sums method finds the centroid of the output membership functions and uses that for the output value. The Middle-of-Maximum method finds the two highest points in the scaled output membership functions and uses a value in the middle of the maximums as the output value. The Height method uses the heights of the scaled membership functions to calculate the centroid of the membership functions. It then uses the centroid as the output value. The Center-of-Sums method for defuzzification is preferred in the present invention.

Much more could be said about the standard fuzzy logic controller that forms the heart of the present invention but one of ordinary skill in the art would know how to construct and implement a standard fuzzy logic controller so more description will not be given here. More background information on fuzzy logic controllers is given in the book *Neural Networks and Fuzzy Systems* by Bart Kosko, Prentice Hall, Englewood Cliffs, N.J., 1992. The background information on fuzzy logic controllers given in that book are incorporated herein by reference.

Figure 3:
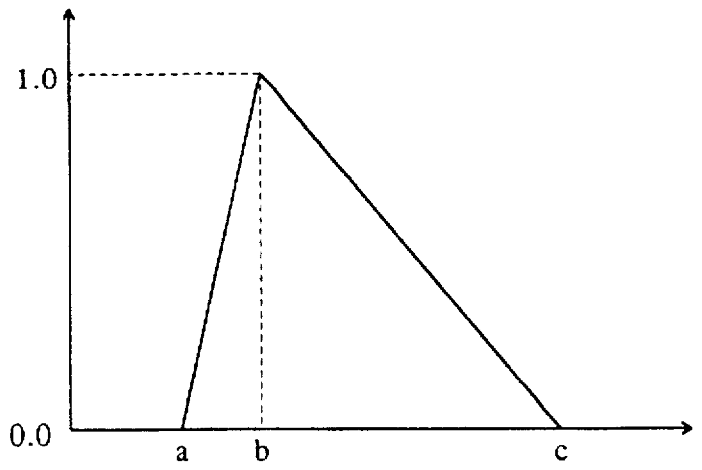
FIG. 3 is a single triangular membership function represented by the triple [a,b,c].

For use with the fuzzy logic controller of the present invention, the membership functions must fulfill several criteria. The membership functions should be triangular. Triangular membership functions are preferred because they can be evaluated with minimal computational complexity. A triangular membership function such as the one shown in FIG. 3 can be represented by three points a, b, c. The point a is the left hand side of the membership function, b is the point at which the membership function returns its maximum value, and c is the right hand side of the membership function. The maximum value of the membership function that would be returned at point b should be 1. Any three adjacent membership functions should be properly overlapped. For any three adjacent membership functions A, B and C, A is the membership function on the left, B is the middle membership function and C is the membership function on the right. The point of maximum value b of the membership function A should correspond to the left hand side a of membership function B. The right hand side c of the membership function A and the left hand side a of the membership C should correspond to the point of maximum value b of the membership function B. The point of maximum value b of the membership function C should correspond to the right hand side c of the membership function B. In this way, for any given value of the input variable, only two membership functions will return non-zero values and the sum of those two membership functions will be 1. If the membership functions meet this criteria then they are said to be properly overlapped. Properly overlapped triangular membership functions assure a continuous crisp output within the universe of discourse.

The universe of discourse should be symmetric. By that it is meant that all of the membership functions within the universe of discourse are symmetric about the centroid of the universe of discourse. Generally the centroid of the universe of discourse will represent zero error in the controlled variable. Therefore, for every membership function describing a positive error, there should be an identical, symmetric membership function describing a negative error. There should also be an odd number of membership functions so that the center membership function represents zero error and is symmetric about its own centroid.

The universe of discourse should be normalized to have a domain of −1 to +1. The membership functions can lie within a normalized universe of discourse if the input and output data is remapped between the real axis to the normalized universe of discourse. The input and output can be remapped between the real axis and the normalized universe of discourse by applying a transformation function. If the data measured in the real axis lies within the interval $a^-$ to $a^+$ then it can be mapped to the normalized universe of discourse by applying the transformation $$[-1,1]=([a^-, a^+]-m)/C$$

In this transformation C is a real number called the scaling factor and m is a translation representing the target value of the controlled variable on the real axis. The scaling factor C and the translation m can be calculated with the equations $$m=(a^-+a^+)$$

$$C=(a^--a^+)/2$$

The data can be remapped back onto the real axis from the normalized universe of discourse with the transformation $$[a^-, a^+]=C\,[-1,1]+m$$

The scaling factor 1/C is called the input fuzzy gain (IFG) if it is used to scale an input control variable and the scaling factor C is called the output fuzzy gain (OFG) if it is used to scale an output control variable. The numeric value of C is not necessarily the same in the IFG and the OFG.

If the IFG and the OFG are constants in the control system then the resulting fuzzy logic control is a standard fuzzy logic controller. However, if the IFG and the OFG are dynamically changing then the resulting controller is a dynamically adaptive fuzzy logic controller. The input/output relationship of the new adaptive controller is no longer deterministic and can be controlled by controlling the IFG and OFG gains.

Figure 4:
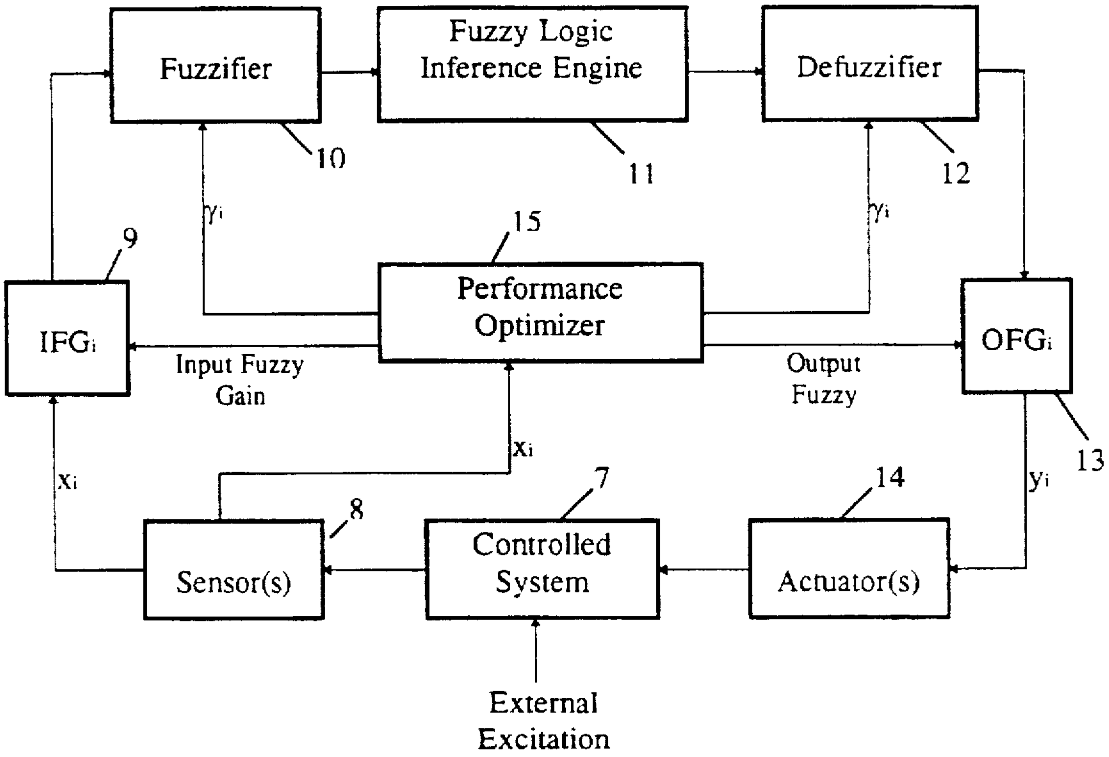
FIG. 4 is a block diagram of the fuzzy interval controller of the present invention.

Because the dynamically adaptive controller remaps intervals between the normalized universe of discourse and any interval on the real axis depending on the values of the IFG and OFG the controller is called a fuzzy interval controller. A block diagram of the fuzzy interval controller is shown in FIG. 4. In the new controller there is a controlled system 7 that has a controlled variable with a target value. A sensor 8 senses the error $x_i$ in the controlled variable away from the target value. The error $x_i$ is then scaled by the input fuzzy gain 9. The input fuzzy gain is determined by a performance optimizer 15. The performance optimizer 15 will be described in more detail later. The scaled error is then input into the fuzzifier 10 that evaluates the scaled error in the input membership functions. The fuzzified input data is then input into the fuzzy rules of the fuzzy logic inference engine 11 to obtain a fuzzy output. The fuzzy output is defuzzified in the defuzzifier 12 by averaging the output membership functions using a standard method such as the Center-of-Sums method. The defuzzified output is then remapped back to the real axis by multiplying it by an output fuzzy gain 13. The output fuzzy gain is also determined by the performance optimizer 15.

In addition to remapping the input and output variables between the real axis and a normalized universe of discourse using the dynamically changing IFG and OFG, the controller of the present invention has one more distinction from a standard fuzzy logic controller. The input and output membership functions are remapped within the normalized universe of discourse to give varying sensitivity.

Figure 5:
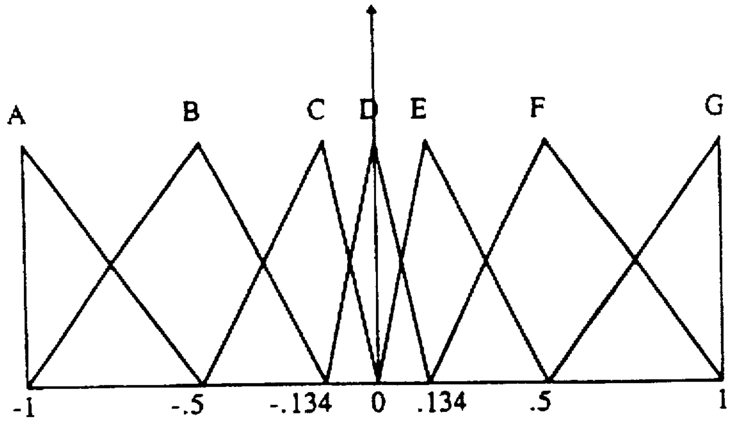
FIG. 5 shows a set of membership functions for the fuzzy interval controller of the present invention with the sensitivity index set to 1.
Figure 6:
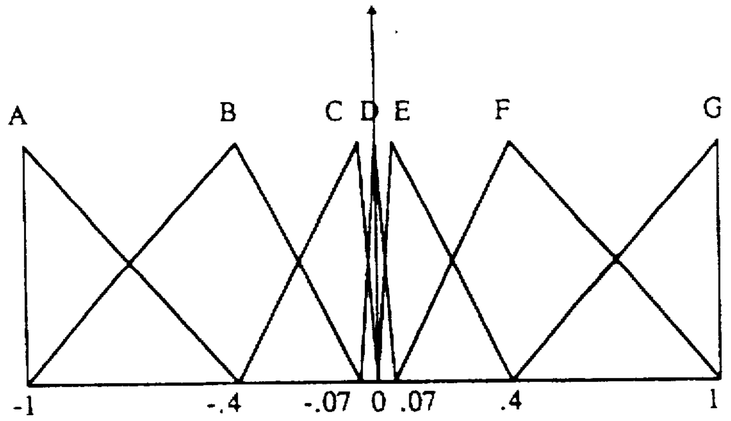
FIG. 6 shows a set of membership functions for the fuzzy interval controller of the present invention with the sensitivity index set to 0.5.
Figure 7:
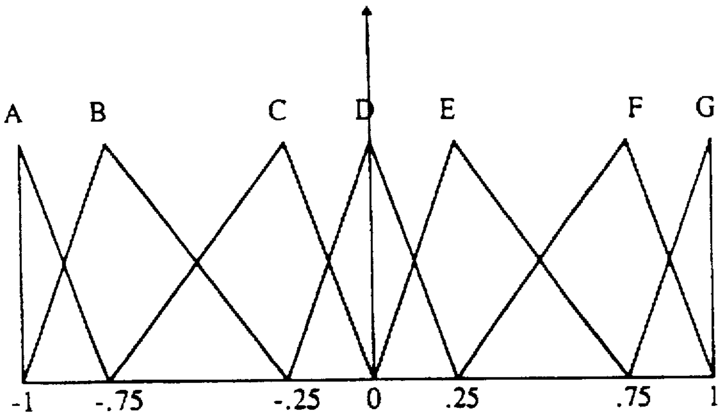
FIG. 7 shows a set of membership functions for the fuzzy interval controller of the present invention with the sensitivity index set to 2.

The membership functions are shown in FIGS. 5–7. It can be seen that there is an odd number of membership functions. Seven membership functions are shown but there may be more or less of them. As was discussed earlier in reference to FIG. 3, each membership function is triangular and can be described by three numbers representing the left hand side, maximum value, and right hand side of the triangle. The left hand side and right hand side of adjacent membership functions coincide with the maximum value of any given membership function so that the functions are properly overlapped. Therefore, by specifying the positions of the maximum values of each of the membership functions, all of the membership functions within the universe of discourse are fully described. It can be seen that the leftmost membership function returns a maximum at the left edge of the universe of discourse, or at an input value of −1. Similarly, the rightmost membership function returns its maximum value at the right hand side of the universe of discourse, or at an input value of +1. The center membership function returns its maximum value at an input value of 0. Because of the fact that the membership functions have been defined to be symmetric about the centroid of the universe of discourse, the functions to the left of the centroid will mirror those to the right of the centroid. Therefore only the positions of the maximum values of the membership functions between 0 and 1 need to be specified and all of the membership functions in the entire universe of discourse will be fully described. If there are n membership functions, only (n−1)/2−1 numbers need to be given to describe all of the membership functions.

The numbers used to described the membership functions will be called $a_i$. The values of each $a_i$ can be calculated by the equation, $$a_i(\gamma)=1-(\cos((\pi/2)\,(i/(n+1))))^{\gamma},$$

$$i=1, 2, 3, \ldots, m$$

$$\text{where } m=(n-1)2-1$$

The parameter γ is a new parameter that determines the width, skewness and positions of the membership functions. Higher values of γ give greater sensitivity to large errors and less sensitivity to small errors. Lower values of γ give greater sensitivity to small errors and less sensitivity to large errors. Therefore, the parameter γ is called the sensitivity index.

In FIGS. 5–7 there are seven total membership functions. So the value of m is m=(7−1)/2−1 =2. In FIG. 5, the value of the sensitivity index is γ=1 and $a_1$=0.134 and $a_2$=0.5. In FIG. 6, the value of the sensitivity index is γ=½ and $a_1$=0.07 and $a_2$=0.393. In FIG. 7, the value of the sensitivity index is γ=2 and $a_1$=0.25 and $a_2$=0.75.

It can be seen that in FIG. 6, with a lowered value of γ, the membership functions have been "pulled" towards the centroid of the universe of discourse. This results in greater sensitivity to small errors and less sensitivity to large errors. It can be seen that in FIG. 7, with a higher value of γ, the membership functions have been "pushed" away from the centroid of the universe of discourse. This results in less sensitivity to small errors and greater sensitivity to large errors.

The three parameters, input fuzzy gain (IFG), output fuzzy gain (OFG), and sensitivity index (γ), remap data between the normalized universe of discourse and the real axis and remap the membership functions within the normalized universe of discourse. If the IFG, OFG and γ are dynamically changed then the controller becomes very robust and can be optimized in any operating conditions. Because the controller requires only a few membership functions it can be implemented on low cost embedded microcontrollers or custom designed VLSI chips. Also, because of the flexibility provided by the IFG, OFG and sensitivity index, the controller can have an infinitely variable sensitivity. This allows the controller to mimic a standard fuzzy logic controller with an infinite number of membership functions.

While it may be desirable in some applications to allow the IFG, OFG and sensitivity index to be set to any arbitrary value, in the preferred embodiment those three parameters are either doubled or halved in each control cycle. This is because multiplication or division by 2 represents a shift by one bit in binary form and is computationally simple.

The output fuzzy gain has the effect of determining the maximum available control force. The input fuzzy gain has the effect of determining the actual control force generated between 0 and the OFG. The sensitivity index has the effect of increasing or decreasing damping in the system response.

Figure 8:
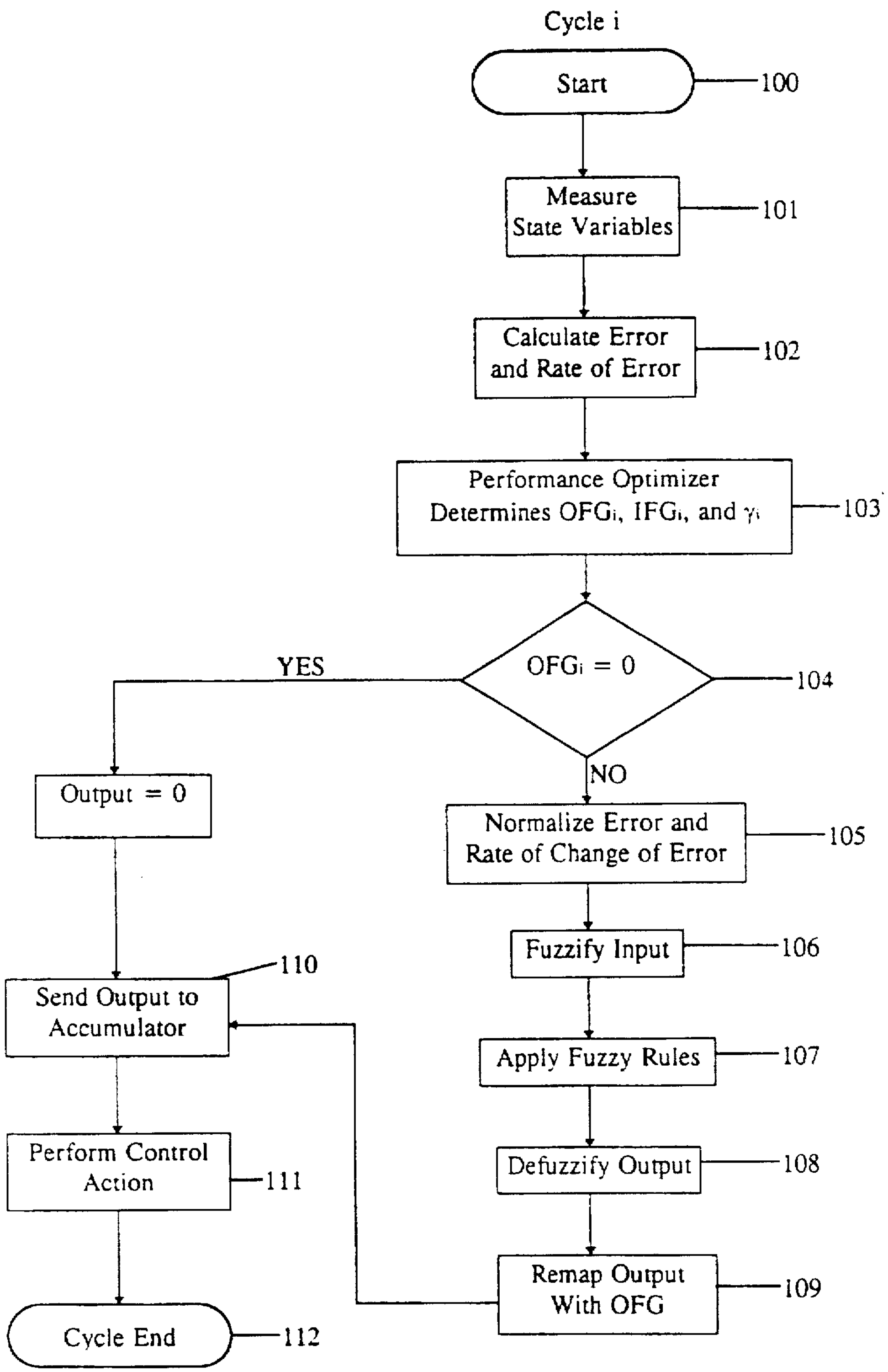
FIG. 8 is a flowchart illustrating the operation of the fuzzy interval controller of the present invention.
Figure 9:
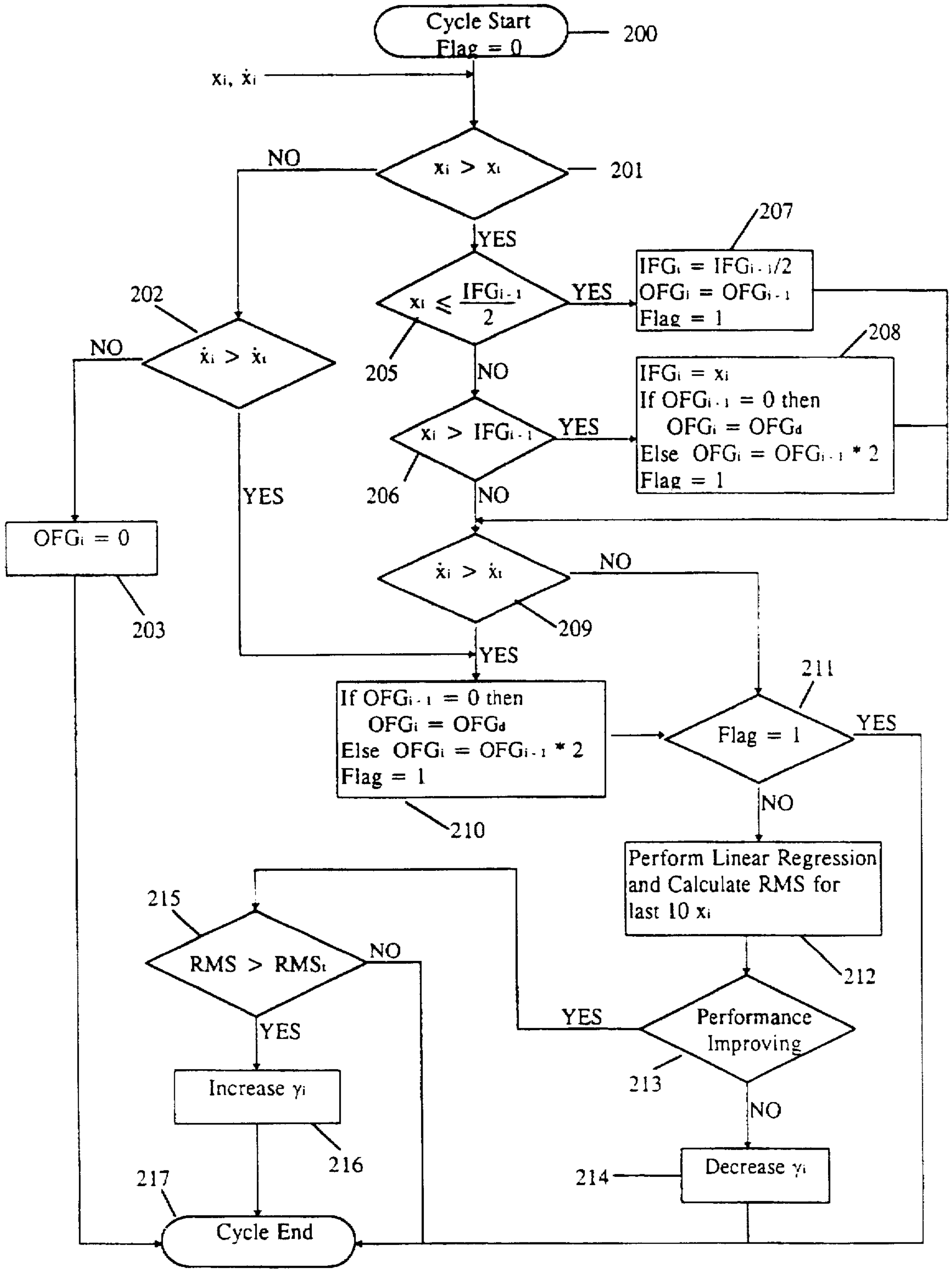
FIG. 9 is a flowchart illustrating the operation of the performance optimizer in the fuzzy interval controller of the present invention.

FIG. 8 is a flowchart illustrating the operation of the fuzzy interval of the present invention. Step 100 starts the control cycle. The first thing that happens in a control cycle is step 101 in which the controlled variables are measured. Next, in step 102, the error and rate of change of the error in the controlled variables are calculated. In step 103, the performance optimizer determines the appropriate values for the input fuzzy gain, the output fuzzy gain and the sensitivity index. Step 104 checks to see if the OFG is equal to zero. If the OFG equals zero then no control action is taken and the control cycle ends. If the OFG does not equal zero then the input variables are normalized using the IFG in step 105. The next three steps, 106, 107 and 108 represent the operation of a standard fuzzy logic controller in which the inputs are fuzzified, the fuzzy rules applied, and the output defuzzified. In step 109 the normalized output is remapped back to the real axis. The control output is then fed into an accumulator in step 110. In step 111 a signal is given to the actuator to achieve some control action. Step 112 is the end of the control cycle.

The key to setting the values of the IFG, OFG and sensitivity index, and therefore the key to the whole invention, is the performance optimizer. The performance optimizer keeps track of the system performance over a given period of time and adjusts the three parameters to give the desired behavior. In different applications, the desired behavior may be defined in different ways. Therefore, it is somewhat up to the designer to determine what the desired system behavior is and how the performance optimizer must vary the IFG, OFG and sensitivity index to give the desired behavior. For instance, it may be desired that the performance optimizer comprise a neural network that "learns" what the best values of the IFG, OFG and sensitivity index is given a certain input and a certain system behavior over a given period of time. A neural network would use its experience to improve upon what it has "learned" and the system performance would continually improve.

The operation of one preferred embodiment of the performance optimizer is shown in FIG. 8. In this preferred embodiment, the performance optimizer first sets the values of the IFG and the OFG. If either the IFG or the OFG are changed then the sensitivity index is not changed. If neither the IFG or the OFG is changed then the sensitivity index can be optimized to ensure that the system performance is improving and is not oscillating.

In FIG. 8, the performance optimizer is called at step 200 and a flag is set to zero. The flag will be used to see if either the IFG or the OFG have been changed in the current control cycle. The error and rate of change of error in the controlled variable are read into the performance optimizer. In step 201, the error is compared to some small threshold error. If the error is below the threshold then the rate of change of error is compared to some threshold in step 202. If both the error and the rate of change of error are below threshold values then the OFG is set to 0, thereby suppressing any control action and the cycle is ended. If, in step 201, the error is above the threshold value then error is compared to the IFG for the previous cycle in steps 205 and/or 206. In step 207, if the error is less than half of $IFG_{i-1}$ then $IFG_i$ is set to one half of $IFG_{i-1}$ and the OFG is maintained from the previous control cycle. In step 208, if the error is greater than $IFG_{i-1}$ then $IFG_i$ is set equal to the error and the OFG is either set equal to a default value $OFG_d$ or else it is doubled depending on whether it was nonzero in the previous control cycle. If the IFG is changed in either step 207 or 208 then the flag is set to 1. Next, in step 209 the rate of change of error is compared to a threshold value. If the rate of change of error is above the threshold then the error is growing and, in step 210 the OFG is doubled to increase the control force and prevent the error from growing further. In step 211 the flag is checked to see if the IFG or OFG have been changed in which case the cycle is ended. In step 212 a linear regression and RMS calculation is performed on the last several input values. It is preferred that the 10 most recent input values should be saved and used in step 212. The slope of the linear regression is examined in step 213 to see if the system performance is improving. If performance is not improving (the performance is degrading or remaining the same) then the sensitivity index is decreased in step 214 to make the system more sensitive to small errors and the cycle is ended. If the performance is improving then the RMS is compared to some threshold value in step 215 to see if the error has been oscillating around zero error. If the error has been oscillating then the sensitivity index is increased in step 216 to make the system less sensitive to small errors. Finally the control cycle ends in step 217.

A fuzzy logic controller has been described that is dynamically adaptive to changing operating conditions by remapping intervals between the real axis and a normalized universe of discourse and by remapping the membership functions within the normalized universe. By dynamically selecting values of an input fuzzy gain, an output fuzzy gain, and a sensitivity index, the sensitivity of the controller can be adapted to give high sensitivity during "smooth" operating conditions and low sensitive during "rough" operating conditions. The controller has the advantage of requiring very little or no a-priori knowledge of the controlled system. The controller has very low requirements for computational hardware and memory and therefore it is very fast and can be implemented on low cost embedded microcontrollers. The controller can be totally suppressed by setting the output fuzzy gain to zero.

While preferred embodiments of the invention have been shown and described, it will be apparent to those skilled in the art that various modifications may be made in these embodiments without departing from the scope of the invention. Therefore, it is intended that the invention not be limited to the particular embodiments disclosed but that the scope of the invention be defined by the following claims.

I claim:

1. A fuzzy logic controller comprising:

a controlled system, means for sensing at least one variable from said controlled system, means for fuzzifying said at least one sensed variable by evaluating a plurality of input membership functions for said at least one sensed variable, means for converting said at least one fuzzified sensed variable to a plurality of output membership functions, means for defuzzifying said plurality of output membership functions to generate at least one output variable, means for outputting said at least one output variable to an actuator, and means for remapping said plurality of input membership functions within an input universe of discourse and for remapping said output membership functions within an output universe of discourse.

2. The fuzzy logic controller of claim 1 wherein said means for remapping said plurality of input membership functions and for remapping said output membership functions uses a sensitivity index that shifts said plurality of input membership functions and said plurality of output membership functions relative to the centroid of their respective universe of discourse.

3. The fuzzy logic controller of claim 2 wherein said sensitivity index is dynamically calculated during operation of the controller.

4. The fuzzy logic controller of claim 2 wherein a higher value of said sensitivity index causes the controller to be less sensitive to small values of said sensed variable and a lower value of said sensitivity index causes the controller to be more sensitive to small values of said sensed variable.

5. The fuzzy logic controller of claim 2 wherein a higher value of said sensitivity index causes said plurality of input membership functions and said plurality of output membership functions to shift away from the centroid of their respective universe of discourse and a lower value of said sensitivity index causes said plurality of input membership functions and said plurality of output membership functions to shift towards the centroid of their respective universe of discourse.

6. The fuzzy logic controller of claim 2 further comprising a performance optimizer that determines the value of said sensitivity index to optimize the performance of the controller.

7. A fuzzy logic controller comprising:

a controlled system, means for sensing at least one variable from said controlled system, means for fuzzifying said at least one sensed variable by evaluating a plurality of input membership functions for said at least one sensed variable, means for converting said at least one fuzzified sensed variable to a plurality of output membership functions, means for defuzzifying said plurality of output membership functions to generate at least one output variable, means for outputting said at least one output variable to an actuator, and a performance optimizer that modifies at least one of said at least one sensed variable, said at least one output variable, said plurality of input membership functions, and said plurality of output membership functions thereby to optimize the performance of the controller.

8. The fuzzy logic controller of claim 7 wherein said performance optimizer stores the values of said at least one sensed variable for a predetermined period of time and optimizes the performance of the controller based on the stored values of said at least one sensed variable.

9. The fuzzy logic controller of claim 7 wherein said performance optimizer dynamically modifies at least one of said at least one sensed variable, said at least one output variable, said plurality of input membership functions, and said plurality of output membership functions during operation of the controller.

10. The fuzzy logic controller of claim 7 wherein said performance optimizer remaps said plurality of input membership functions within an input universe of discourse and remaps said output membership functions within an output universe of discourse.

11. The fuzzy logic controller of claim 10 wherein said performance optimizer uses a sensitivity index that shifts said plurality of input membership functions and said plurality of output membership functions relative to the centroid of their respective universe of discourse.

12. The fuzzy logic controller of claim 7 wherein said performance optimizer scales said at least one sensed variable by an input fuzzy gain and scales said at least one output variable by an output fuzzy gain.

13. A fuzzy logic controller comprising:

a controlled system, means for sensing at least one variable from said controlled system, means for fuzzifying said at least one sensed variable by evaluating a plurality of input membership functions for said at least one sensed variable, means for converting said at least one fuzzified sensed variable to a plurality of output membership functions, means for defuzzifying said plurality of output membership functions to generate at least one output variable, means for outputting said at least one output variable to an actuator, means for scaling said at least one sensed variable by an input fuzzy gain, and means for scaling said at least one output variable by an output fuzzy gain wherein said output fuzzy gain is calculated independently from said input fuzzy gain.

14. The fuzzy logic controller of claim 13 wherein said input fuzzy gain and said output fuzzy gain are dynamically calculated during operation of the controller.

15. The fuzzy logic controller of claim 13 wherein said plurality of input membership functions and said plurality of output membership functions are contained in a normalized universe of discourse that ranges from −1 to +1 and wherein said input fuzzy gain and said output fuzzy gain map said at least one sensed variable and said at least one output variable between said normalized universe of discourse and the real axis.

16. The fuzzy logic controller of claim 13 further comprising a performance optimizer that calculates said input fuzzy gain and said output fuzzy gain thereby to optimize the performance of the controller.

17. The fuzzy logic controller of claim 16 wherein said performance optimizer increases the value of the input fuzzy gain or the output fuzzy gain or both the input fuzzy gain and the output fuzzy gain if the magnitude of said at least one sensed variable exceeds a predetermined value.

18. The fuzzy logic controller of claim 13 wherein said output fuzzy gain can be set to zero thereby suppressing any control action from the controller.

19. The fuzzy logic controller of claim 13 wherein said at least one sensed variable comprises a plurality of sensed variables and said at least one output variable comprises a plurality of output variables, said controller further comprising means for scaling said plurality of sensed variables by a plurality of input fuzzy gains and means for scaling said output variables by a plurality of output fuzzy gains wherein each said input fuzzy gain and each said output fuzzy gain are independently calculated.

20. The fuzzy logic controller of claim 19 further comprising a performance optimizer that calculates each of said input fuzzy gains and each of said output fuzzy gains thereby to optimize the performance of the controller.

* * * * *